(12) United States Patent  
Creamer et al.

(10) Patent No.: US 8,661,112 B2
(45) Date of Patent: Feb. 25, 2014

(54) CUSTOMIZED INTERACTIVE VOICE RESPONSE MENUS

(75) Inventors: Thomas E. Creamer, Boca Raton, FL (US); Brent L. Davis, Deerfield Beach, FL (US); Peeyush Jaiswal, Boca Raton, FL (US); Victor S. Moore, Boynton Beach, FL (US)

(73) Assignee: Nuance Communications, Inc., Burlington, MA (US)

( * ) Notice: Subject to any disclaimer, the term of this patent is extended or adjusted under 35 U.S.C. 154(b) by 1448 days.

(21) Appl. No.: 10/326,687

(22) Filed: Dec. 20, 2002

(65) Prior Publication Data

US 2004/0122941 A1    Jun. 24, 2004

(51) Int. Cl.
*G06F 15/16* (2006.01)

(52) U.S. Cl.
USPC ............... 709/224; 379/88.16; 379/88.18; 345/745; 345/747; 455/419

(58) Field of Classification Search
USPC .................. 709/223, 224, 203, 226, 232
See application file for complete search history.

(56) References Cited

U.S. PATENT DOCUMENTS

| | | | |
|---|---|---|---|
| 5,802,526 A | 9/1998 | Fawcett et al. | 707/104 |
| 5,937,040 A | 8/1999 | Wrede et al. | 379/93.23 |
| 6,295,342 B1 | 9/2001 | Kaminsky | 379/88.23 |
| 6,418,199 B1 | 7/2002 | Perrone | 379/88.01 |
| 6,910,072 B2 * | 6/2005 | Macleod Beck et al. | 709/224 |
| 6,925,168 B1 * | 8/2005 | Launders et al. | 379/355.04 |
| 7,039,166 B1 * | 5/2006 | Peterson et al. | 379/88.18 |
| 2001/0013001 A1 * | 8/2001 | Brown et al. | 704/270.1 |
| 2001/0014146 A1 * | 8/2001 | Beyda et al. | 379/88.25 |
| 2002/0196277 A1 * | 12/2002 | Bushey et al. | 345/745 |
| 2003/0026409 A1 * | 2/2003 | Bushey et al. | 379/211.02 |
| 2003/0091172 A1 * | 5/2003 | Tiliks et al. | 379/126 |
| 2003/0156133 A1 * | 8/2003 | Martin et al. | 345/747 |
| 2003/0223566 A1 * | 12/2003 | Book et al. | 379/219 |
| 2004/0017898 A1 * | 1/2004 | Reynolds | 379/88.18 |
| 2004/0042592 A1 * | 3/2004 | Knott et al. | 379/88.16 |
| 2004/0047453 A1 * | 3/2004 | Fraser | 379/88.18 |
| 2004/0111269 A1 * | 6/2004 | Koch | 704/275 |
| 2006/0153173 A1 * | 7/2006 | Beck et al. | 370/352 |
| 2008/0214173 A1 * | 9/2008 | Preiss et al. | 455/419 |

\* cited by examiner

*Primary Examiner* — Barbara Burgess
(74) *Attorney, Agent, or Firm* — Wolf, Greenfield & Sacks, P.C.

(57) ABSTRACT

A method for providing customized interactive voice response menus can include monitoring user interactions with an interactive voice response system. Data concerning the user interactions can be stored. A request to initiate an interactive voice response session can be received. The interactive voice response system can determine an identity for a user making the request. The interactive voice response system can generate a customized menu for the user. At least a portion of the customized menu can be based upon the usage data. The customized menu can be presented to the user.

18 Claims, 5 Drawing Sheets

CUSTOMIZED INTERACTIVE VOICE RESPONSE MENUS

BACKGROUND OF THE INVENTION

1. Technical Field

The present invention relates to the field of telecommunications and, more particularly, to interactive voice response applications.

2. Description of the Related Art

The advent of interactive voice response (IVR) applications for use in telephone systems has reduced operating costs for many types of businesses by reducing telephone related staffing requirements. Such IVR applications typically answer incoming telephone calls and present to callers audible menus of selectable options. The callers usually make menu selections in one of two ways: depressing a key or sequence of keys on a touch tone keypad; or issuing a spoken utterance.

In an IVR application, a plurality of hierarchically related menus are typically presented which a caller must navigate to find the option that the caller wishes to select. Navigating through such menus can be time consuming and frustrating, especially if the caller makes an incorrect selection during the navigation process. Callers can be exasperated by branches of a menu hierarchy unrelated to the caller's individual concerns, which nevertheless need to be endured before desired menu options are presented. Such contextually unimportant menu options can be particularly aggravating to frequent users of the IVR application. Oftentimes, frustrated callers will hang up prior to successfully navigating the menus or opt out of the menu system in an attempt to speak with an operator. Particularly concerning are the cases where the callers that hang up in frustration are potential customers or clients.

SUMMARY OF THE INVENTION

The invention disclosed herein provides a method and a system for customizing interactive voice response (IVR) menus. In particular, an IVR system can monitor and record user interaction information. Whenever a user initializes an IVR session, the IVR system can generate a customized menu based at least in part on historical interactions. For example, in one embodiment, a menu can be generated that includes menu options for the five IVR nodes that the user most recently accessed. The customized menu can be presented to the user either audibly or visually within a graphical user interface.

Notably, utilizing customized menus based on prior interactions can reduce call duration and can be more efficient than generic IVR menus. Rather than requiring a frequent user to navigate through menu options not pertinent to that user, the IVR system can quickly present the most relevant options based on prior interactions. Because such a customer-centric IVR system can be more appealing to users than conventional systems, users are less likely to opt out of an IVR menu to speak with a human agent. Moreover, users are less likely to hang up out of frustration. As a result of increased usage of the automated system and shorter call durations, the invention can result in substantial resource savings.

One aspect of the present invention can include a method for providing customized interactive voice response menus. The method can include monitoring user interactions with an interactive voice response system and storing the interactions. A request to initiate an IVR session can be received and an identity for a user making the request can be determined. Thereafter, a customized menu based in part upon the previous user interactions can be generated. In one embodiment, the generated customized menu can specify at least two nodes. Moreover, the customized menu can utilize a hierarchical structure to present at least portions of the selected nodes. In a particular embodiment, administrative events relating to operators of at least one interactive voice response node can be monitored. In such an embodiment, customized menus can be based at least in part upon at least one administrative event.

In another embodiment of the present invention, the IVR system can determine a category to which the user is a member. A multitude of users can be included within the category. Category usage data can be accessed based upon user interactions with the IVR system by users within the designated category. At least a portion of the customized menu can be generated based upon the usage data of the category. The customized menu can be presented to the user. In one embodiment, the customized menu can be presented audibly. In anther embodiment, a visual depiction of the customized menu can be viewed by the user. In such an embodiment, the IVR system can transmit the visual depiction to the user as a data signal over a telecom network. A device possessed by the user can receive this data signal, decode the visual depiction, and present the visual depiction within a graphical user interface (GUI). Additionally, the IVR system can receive an IVR selection and responsively perform an IVR operation.

Another aspect of the present invention can include a system for providing customized interactive voice response menus based upon previously stored interactions. This system can include an IVR system configured to generate customized menus based on an identity of a user. The system can also include an interaction data store containing historical information about prior user interactions with the IVR system. The IVR system can generate at least a portion of the customized menus responsive to the historical information.

The IVR system can further include a voice server configured to perform speech to text and text to speech conversions and an IVR monitor configured to track and record user interactions with the IVR system. The IVR monitor can be further configured to track administrative events relating to operators of at least one interactive voice response node. The interactive voice response system can generate at least a portion of the customized menus responsive to these administrative events. The IVR system can also include an IVR menu processor configured to generate customized menus. The IVR menu processor can be further configured to generate a visually displayable menu. Additionally, the IVR system can include an identity processor configured to determine an identity of a user and extract information within the interaction data store based upon this identity.

BRIEF DESCRIPTION OF THE DRAWINGS

There are shown in the drawings embodiments, which are presently preferred, it being understood, however, that the invention is not limited to the precise arrangements and instrumentalities shown.

DETAILED DESCRIPTION OF THE INVENTION

The invention disclosed herein provides a method and a system for customizing interactive voice response (IVR) menus. In particular, an IVR system can monitor and store IVR interactions. These stored interactions can be used to generate customized menus that can be presented to IVR users. For example, an IVR system can determine an identity for a user and look up historical data based upon this identity. A customized menu containing options based upon the historical data can be generated. The customized menu can contain one or more options and can be presented in a hierarchal manner. Consequently, the user can select an option and the IVR system can responsively perform an IVR operation.

Figure 1:
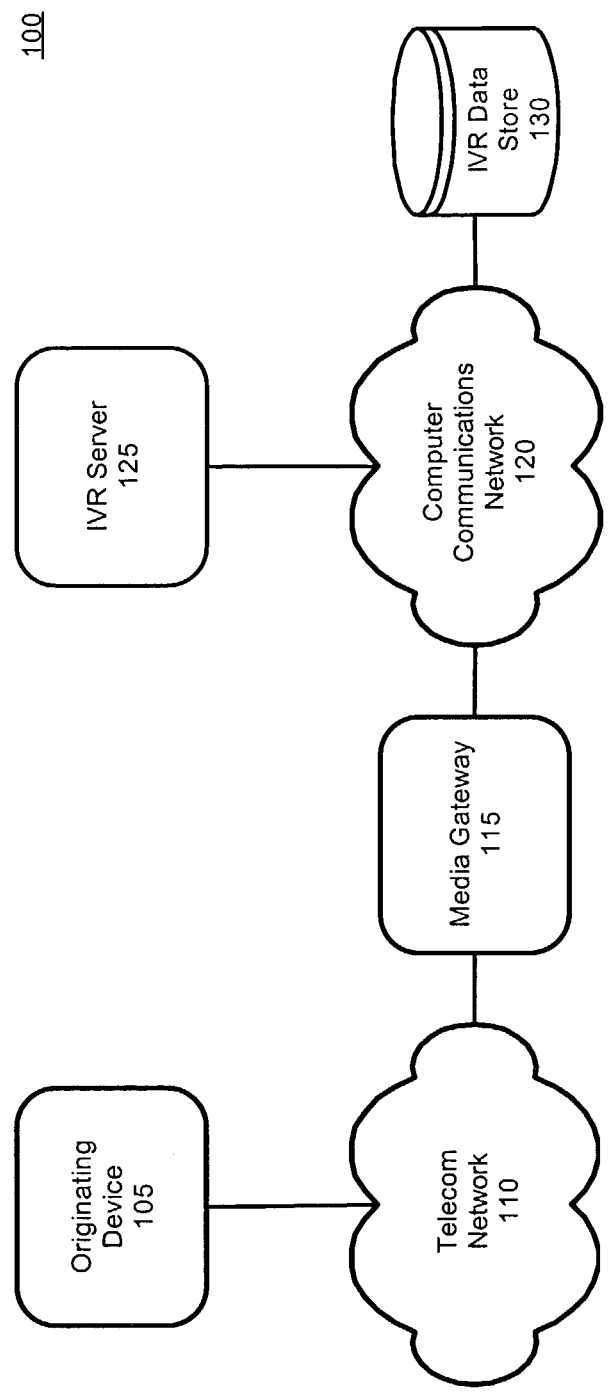
FIG. 1 is a schematic diagram illustrating an exemplary interactive voice response system in accordance with the inventive arrangements disclosed herein.

FIG. 1 is a schematic diagram illustrating an IVR system 100 in accordance with the inventive arrangements disclosed herein. The system 100 can include a telecom network 110, a media gateway 115, a computer communications network 120, and an IVR system 125. The telecom network 110 can include a circuit switched telephony network such as the public switched telephone network (PSTN). Additionally, the telecom network 110 can include wireless telecommunication networks as well as Internet protocol telephony networks.

The media gateway 115 can receive voice data and telephony signaling data from the telecom network 110. Thus, the media gateway 115 can receive calls from the telecom network 110, for example over one or more T1 links, and convert or packetize the voice and signaling data received from the telecom network 110 for communication over the computer communications network 120. Similarly, the media gateway 115 can receive voice data and telephony signaling information from the computer communications network 120 and format convert the voice data and telephony signaling data for transmission over the telecom network 110. For example, the media gateway 115 can format voice data for transmission over a packet switched data link using Real Time-Transport Protocol, while telephony signaling information can be formatted for transmission over a packet switched communication link using JAVA Remote Method Invocation (RMI) over Internet Inter-Orb Protocol (IIOP) to deliver Common Object Request Broker Architecture (CORBA) distributed computing capabilities. Still, any communication protocols suited for audio and telephony signaling data can be used and the present invention is not limited to the use of one or more particular communication protocols.

The computer communications network 120 can be a packet-switched network, for example, a local area network (LAN), a wide area network (WAN), the Internet, or the like. Accordingly, the computer communications network 120 can communicatively link the media gateway 115 with the IVR system 125 and an IVR data store 130. For example, the media gateway 115, the IVR system 125 and the IVR data store 130 can communicate with one another using Internet Protocol (IP) and/or Transmission Control Protocol over IP (TCP/IP). Still, as noted, the invention is not so limited by the particular communications protocol used.

The IVR system 125 can be an application capable of accepting a combination of voice telephone input and touch-tone keypad selections and responsively provide appropriate responses in the form of voice, fax, callback, email and other media. The inputs to the IVR system 125 can be responsive to options presented within an IVR menu. The IVR system can generate customized menus configured for particular users based upon historical usage data. The IVR system 125 can monitor and record new user interactions to update the historical usage data upon which the customized menus are based. Additionally, the IVR system 125 can be capable of generating and transmitting signals containing customized IVR menus to an originating device 105.

In the course of performing IVR operations, the IVR system 125 can access an IVR data store 130. The IVR data store 130 can contain specific information about particular users, IVR system parameters, as well as IVR interactions. The IVR data store 130 can be a data store internal or external to the IVR system 125.

In one embodiment, the IVR system 125 can include an administrative interface to enable administrators to perform menu construction and to adjust parameters for the generation of customized menus. For example, an administrator can utilize the administrative interface to set a default number of nodes displayed within a customized menu. Additionally, the administrative interface can be used to select an algorithm, such as a most frequently used or a most recently used algorithm that can be used when generating the customized menu. Notably, software libraries and administrative GUIs can be provided within the administrative interface. Menu construction tools can be provided within a menu construction module of the administrative interface to facilitate menu construction, as is known to those skilled in the art of programming software applications. Functions available within the administrative interface can include commands, logical operators, conditional statements, and any other code used in computer programming.

The IVR system 125 can include one or more IVR applications hosted on one or more IVR servers. In one embodiment, the IVR system 125 can be a network element that interfaces with the telecom network 110 through the media gateway 115. In another embodiment, the IVR system 125 can include a stand-alone solution contained within a single server interfacing directly with the telecom network 110 without being communicatively linked to the computer communications network 120. The IVR system 125 can alternatively be implemented by multiple servers in a distributed fashion. In a particular example, an IVR system 125 can be an IVR application disposed within an electronic private automatic branch exchange system (EPABX) owned and maintained by a particular business. Consequently, there are many potential configurations for the invention and FIG. 1 is intended to be construed as one of many possible embodiments.

Figure 2:
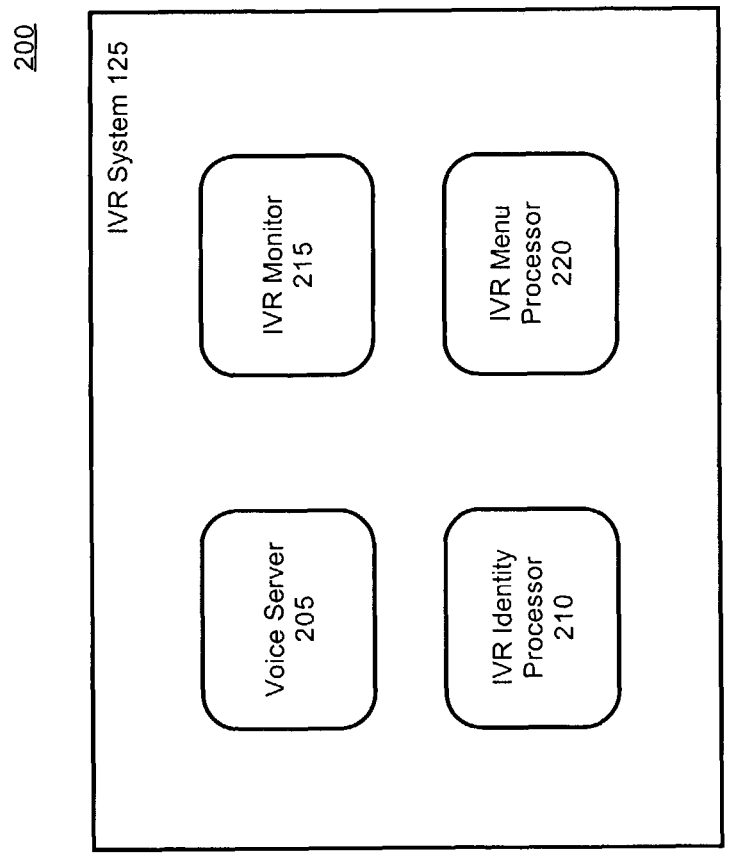
FIG. 2 is a schematic diagram illustrating another exemplary interactive voice response system in accordance with the inventive arrangements disclosed herein.

FIG. 2 is a schematic diagram illustrating an IVR system 200 in accordance with the inventive arrangements disclosed herein. The system 200 can include a voice server 205, an IVR identity processor 210, an IVR monitor 215, and an IVR menu processor 220. The voice server 205 can provide voice processing features such as a speech recognition engine for recognizing speech and a voice processing system for matching a subscriber voice to a known subscriber voice profile for purposes of speaker identification, a text-to-speech system for converting text to an audio stream, as well as an audio playback system. The voice server 205 can be communicatively linked to a database, such as the IVR data store 130.

The IVR identity processor 210 can determine an identity for the user initiating an IVR session. In one embodiment, the identity for a user can be determined based upon the telephone number associated with the calling device. For example, an automatic number identification (ANI) service can be utilized to provide the IVR identity processor 210 with the number of the calling phone. Alternately, caller id (CID) or calling number delivery (CND) information can be used to extract the name and number associated with a directory listing of a calling telephone. In another embodiment, the caller can be prompted by the IVR identity processor 210 to provide identity information. This prompting could be for the caller's name, for an account associated with the caller, or for some other caller identifier. Additionally, the IVR identity processor 210 can prompt the user for a keypad entry, for a voice response, or for some other input. For example, the IVR identity processor 210 can prompt a caller to input a social security number via the telephone keypad so that the caller can be uniquely identified.

Once the IVR identity processor 210 determines the identity for the IVR user, a data store, such as the IVR data store 130, can be queried for information. The data store can store previous IVR interactions, and references to the user identity. For example, if a user is referenced by a calling telephone number, the data store can contain multiple records, each record containing a phone number, a selected IVR node, and a date the node selection was made. In another example, where the user can be identified by a voice profile, a voice print specifying vocal characteristics of the user can be contained within the data store.

The IVR monitor 215 can track and record user interactions and IVR nodes corresponding to the user interactions. For example, if the IVR identity processor 210 identities a particular caller by an account number and a category, the IVR monitor 215 can track user interactions with the IVR system by account number and category. The IVR monitor 215 can update the historical information or data store referenced by the IVR identity processor 210.

In addition to IVR interactions, the IVR monitor 215 can track administrative events relating to operators of at least one interactive voice response node. For example, a particular IVR node can represent an employee's telephone extension and the IVR monitor 215 can track whether that employee is available for receiving telephone calls. If the IVR monitor 215 determines the employee is unavailable, alternate actions, such as sending an email message, contacting a secretary or other alternate, or transferring the caller to a voice mailbox can result. In one embodiment, the options available to the IVR monitor 215 can vary according to the identity of the caller.

The IVR menu processor 220 can generate a customized menu containing nodes that are available within the IVR system 125. Portions of the customized menus can be based upon historical information associated with the identified user. In one embodiment, the IVR menu processor 220 can generate an option menu and present this option menu to the user. The generated menu can include a one or more options and can be either a single layer menu or a series of options layered in a hierarchy. For example, a user can be presented with a series of four menu options each associated with a keypad number.

In another embodiment, the IVR menu processor 220 can construct a menu that triggers a selected IVR operation. For example, a node within an IVR system can establish a connection with a particular telephone extension. Assume, historical information indicates that an identified caller has contacted the IVR system 125 ten times before and requested the node for a particular telephone extension on each previous interaction. In such a situation, the IVR menu processor 220 can connect the user directly to the previously requested telephone extension. In other words, the IVR menu processor 220 can generate a single node that results in an IVR operation associated with establishing the telephony connection.

In addition to generating the content for a customized menu, the IVR menu processor 220 can vary the format of the customized menu. For example, in one instance the IVR menu processor 220 can generate an audible menu for presentation to a telephony device. Alternately, the IVR menu processor 220 can generate a visual representation of the customized menu and transfer this visual representation to the caller. Such a visual representation can be encoded within a data signal and the data signal conveyed over a telecom connection. The caller can then decode the data signal and display the visual representation within a graphical user interface.

It should be appreciated that the IVR identity processor 210 is not limited to identifying users as discrete units. Indeed, in many applications it can be useful to categorize users and base numerous IVR functions upon this category. For example, a user can be categorized as a student-customer. In such an example, the data store can contain historical information concerning IVR interactions associated with the student-customer category. IVR systems can store and utilize both category based information and individual based information. Accordingly, when customized menus are created, some included menu nodes can be based upon the caller's previous interactions and other menu nodes can be based on selections made by users of the category to which the identified user belongs. Systems that use both individual and category based information can be extremely valuable to many businesses, especially to businesses that market products to targeted groups.

It should also be appreciated that when constructing customized menus based upon previously recorded interactions, the IVR menu processor 220 can utilize a variety of techniques and parameters. For example, the IVR menu processor can base the creation of custom menus upon a most recently used algorithm, a most frequently used algorithm, upon selections specified for a group to which the user belongs, upon a hot list of menu nodes defined by the user, or any combination thereof. A most recently used algorithm, such as last in first out (LIFO), can utilize a list of previous interactions based strictly upon chronological usage. A most frequently used algorithm, on the other hand, can track the number of times, or frequency, over a predefined time period, such as thirty days, that particular interactions occurred. The most frequently used algorithm, then displays those interactions that occur the greatest number of times during the predefined time period.

In many of these menu creation techniques, parameters, such as the number of presented nodes within a menu, can be necessary. In one embodiment, the parameters can be adjustable by a system administrator of the IVR system 125. In another embodiment, facilities can be granted to users so that each user can define menu customization parameters applicable to the IVR sessions of the user.

Notably, the voice server 205, the IVR identity processor 210, the IVR monitor 215, and the IVR menu processor 220 need not be discrete elements within the IVR system 125. Instead, the functions described within system 200 are separated into the named structural components for illustrative purposes only. Accordingly, the invention is not intended to be limited to the modular groupings depicted within system 200. Instead, the IVR system 125 itself can perform some of all of the functions attributed to the aforementioned components. Moreover, other combinations of components capable of performing the tasks associated with the aforementioned components are contemplated.

Figure 3:
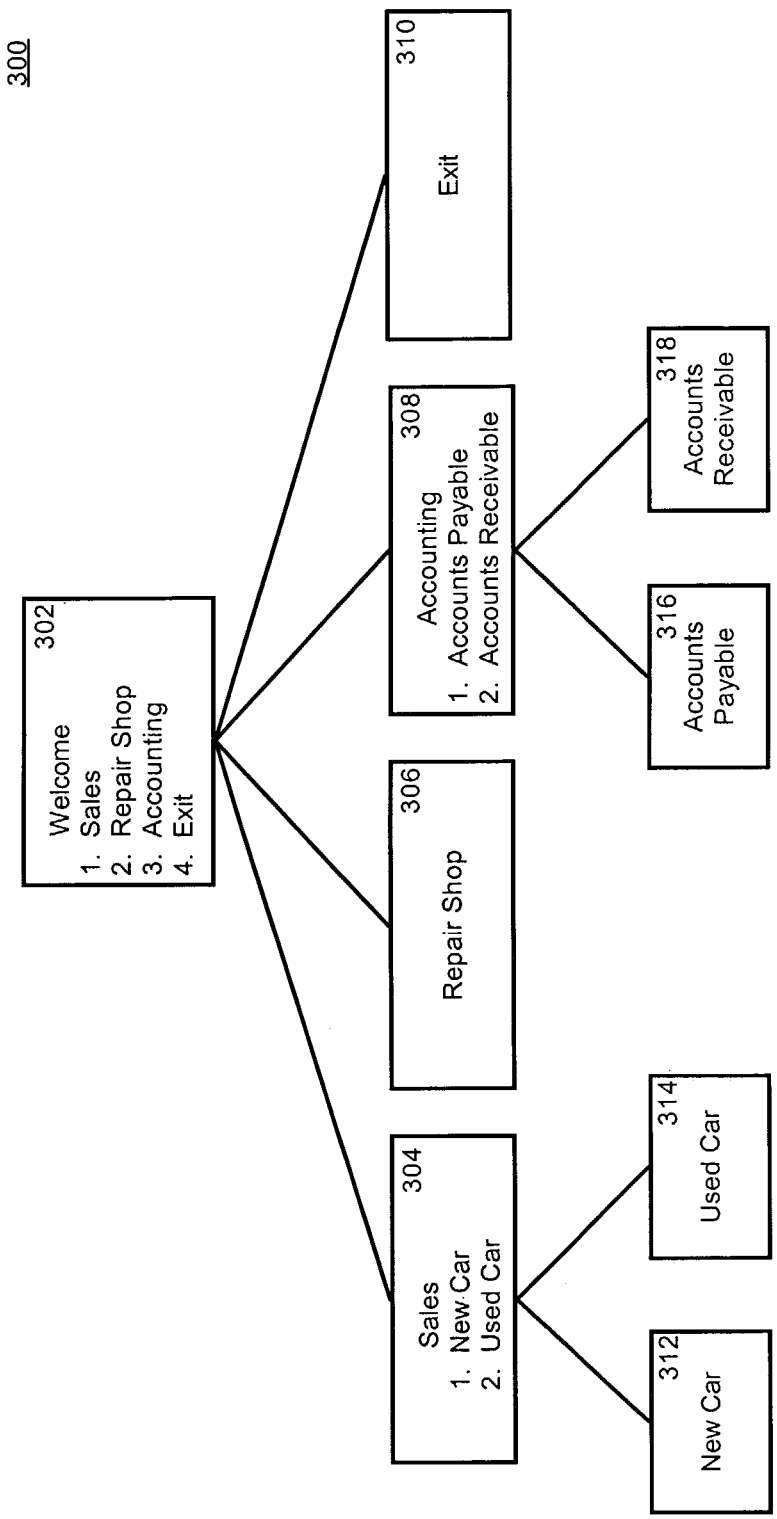
FIG. 3 is a schematic diagram illustrating a view of an IVR menu which can be presented on a presentation device in accordance with the system of FIG. 1.

FIG. 3 is a schematic diagram illustrating a menu 300 in accordance with the system of FIG. 1. The menu 300 is shown with a hierarchical structure having leaves presented in parent/child relationships. Menu 300 can include a variety of leaves 302, 304, 306, 308, 310, 312, 314, 316, and 318 that can each contain one or more IVR options. IVR options correspond to various termination points, wherein the termination points can be internal to the menu or external. For example, some IVR options that are linked to IVR leaves can be primarily navigational in nature. These navigational IVR leaves can group similar IVR functions together. Other IVR options can redirect a caller to a particular phone extension, can redirect to an external telephone number, or can cause an IVR application to be executed to process the received call.

For example, leaf 302 can be presented with navigational IVR options that specify child leaves located at a hierarchical level below leaf 302. More particularly, the specified child leaves include a sales leaf 304, a repair shop leaf 306, an accounting leaf 308, and an exit leaf 310. Hence, leaf 302 can be a navigational IVR leaf.

The selection of the sales option designated as the first IVR option can cause the IVR system to branch to the sales leaf 304. Notably, the sales leaf 304 can have two IVR options, each designating a particular child node. The selection of IVR option 2 from within sales leaf 304 can cause the IVR system to branch to the used car leaf 314. When leaf 314 is selected, a voice channel connection can be established between a person accessing menu 300 and an individual within a designated used car department. Hence, leaf 314 can be a leaf associated with a telephony extension.

In operation, the invention can begin creating a customized menu based upon menu 300 by recording a sequence of user interactions. The first step in recording a user's interactions is to identify a user. Assume a user utilizes menu 300 on Day 1 and ultimately selects leaf 314. On Day 2, the same user can utilize leaf 310 and leaf 312. On Day 3, the user can utilize leaf 314 again. At this point, a data store associates two interactions by the use for leaf 314, one for leaf 310, and one for leaf 312 with the user.

Some embodiments of the system can require a minimum number of interactions before a user is presented with a customized menu instead of the standard one. Assume for this example that the forth time the user utilizes menu 300, a customized menu is generated. When the user establishes an IVR session, the user is identified and the previous interactions accessed. The system can generate a one-level menu with four options: option one (1) for leaf 314 specifying used car sales, option two (2) for leaf 312 specifying new car sales, option three (3) for leaf 310 specifying exit, and option four (4) that returns the user to a default menu.

Some options, such as leaf 310 specifying an exit operation can be filtered by the IVR system and ignored when creating a customized menu. Additionally, if many menu selections appearing within the custom menu have a common parent node, such as leaf 304 specifying sales, then that parent node may be included within the custom menu. Furthermore, options can be included within the customized menu to allow a user to navigate from the present node in a hierarchy to a parent node. Users can also be permitted to navigate to a "home" or top level node of a menu.

It should be noted that some customized menus can be configured based at least in part upon available system information. For example, assume that two nodes exist for used car sales and that the first line was busy. The IVR system can monitor such system information and only include the second node for used car sales within the customized menu. In another example, a customized menu can include only IVR options associated with communication extensions manned by persons speaking the user's preferred language. For example, if there are eight sales persons in a particular office but only four of the eight speak Spanish, the menu can be configured to only show the IVR options correlating the extensions for the Spanish speaking sales persons in the event that Spanish is the preferred language of the identified user.

Notably, menus can be optimized for specific users, classes of users, user locations, dates, times, or any other circumstance that can affect IVR navigation or communications link routing. For example, the IVR system can include a program module which determines a region from which a user is calling. Regional determinations can be based upon telephone numbers, nodes being used in the communication network linking the user to the IVR system, or any other location identification method. Users from an English speaking country can be presented menus in English, while users from Spanish speaking countries can be presented menus in Spanish.

Unlike many conventional IVR menu hierarchies that require a user to audibly listen to IVR options while connected to an IVR system via a voice channel connection, a visual depiction of the menu 300 can be conveyed to the user. Accordingly, the risk of a user forgetting a number associated with a particular menu option can be reduced, thereby saving the customer time and frustration as well as reducing system resource usage. Once the user is presented with a visual depiction of the menu 300, the user need not maintain a connection with the IVR system. Consequently, the user can incur fewer telephony toll charges in IVR systems with visual menu capabilities.

It should be noted that the various menus disclosed herein are shown for purposes of illustration only. Accordingly, the present invention is not limited by the particular menus presented herein. Rather, those skilled in the art will recognize that any of a variety of different menus can be used. For example, the menus can be any menu type, can have any menu structure, and can be presented with any number of levels.

Figure 4:
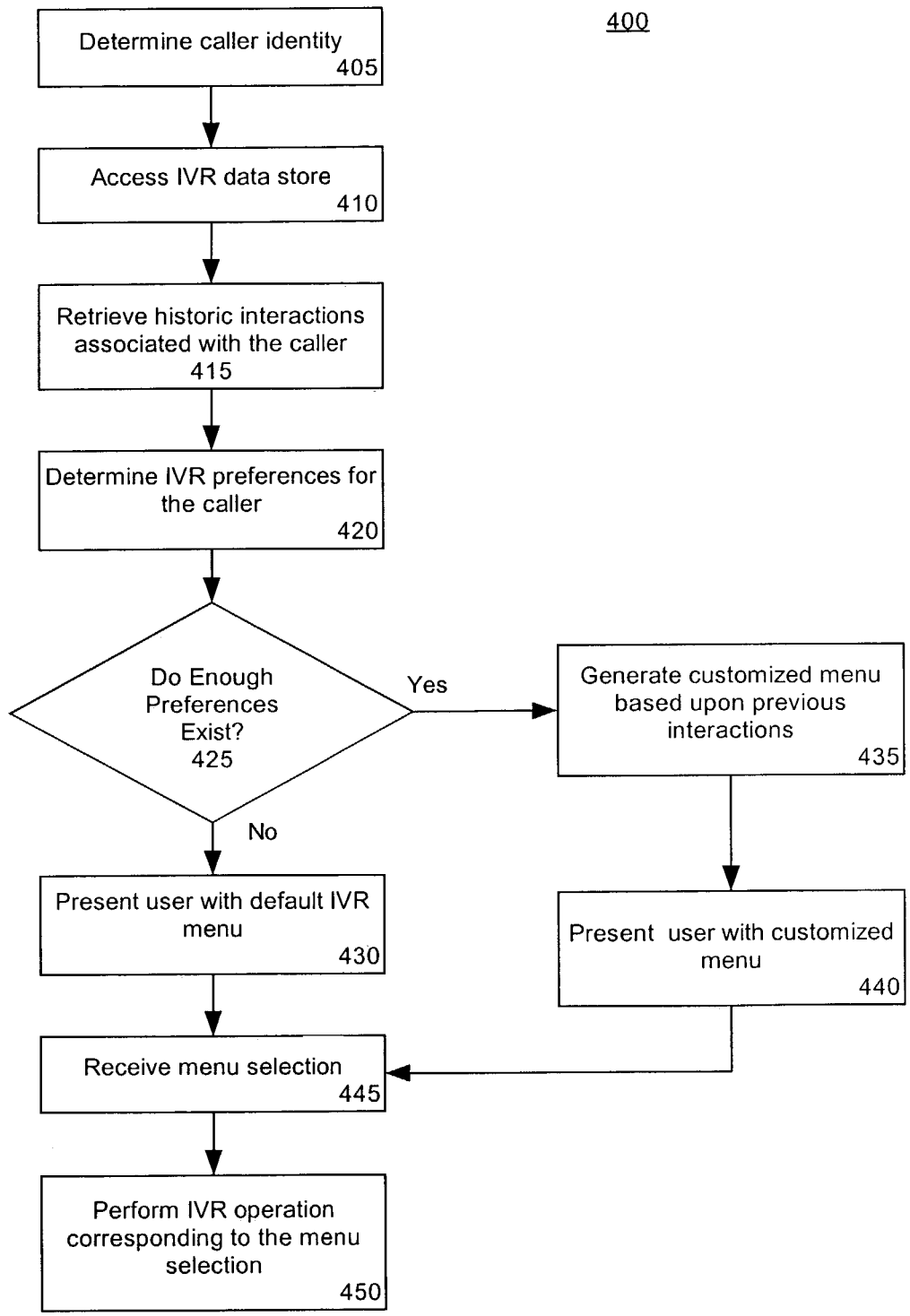
FIG. 4 is a flow chart illustrating a method of generating customized menus in accordance with the system of FIG. 1.

FIG. 4 is a flow chart illustrating a method 400 of generating customized menus in accordance with the system of FIG. 1. The method 400 can be performed in the context of an IVR session. The method can begin in step 405 where the IVR system can determine an identity for the caller. The identity can be determined based upon a calling number, a voice identifier, or through responses to queries. In step 410 an IVR data store can be accessed to determine whether previous interactions have been recorded for the identified user. In particular cases, the system can also check interactions relating to a category to which the user belongs.

In step 415, the interactions applicable to the identity can be retrieved. In step 420, IVR caller preferences can be identified and appropriate system parameters based on such preferences can be set. For example, the system can utilize user specified menu generation algorithms. In step 425, the system can determine based on the identified IVR interactions if a customized menu can be constructed. It should be noted that the system can require a particular number of interactions before customized menus are generated. If the IVR system determines that not enough interactions exist, the method can proceed to step 430, where the user can be presented with a default IVR menu.

If enough interactions do exist in step 425, then the method can proceed to step 435 where the IVR system can generate a customized menu based upon the interactions. Customized menu creation can occur as previously described. In step 440, the user can be presented with the customized menu. After the user is presented with a menu, in step 445, the user can make a menu selection. This menu selection can be received by the IVR system. In step 450, the IVR system can perform an IVR operation corresponding to the menu selection.

Figure 5:
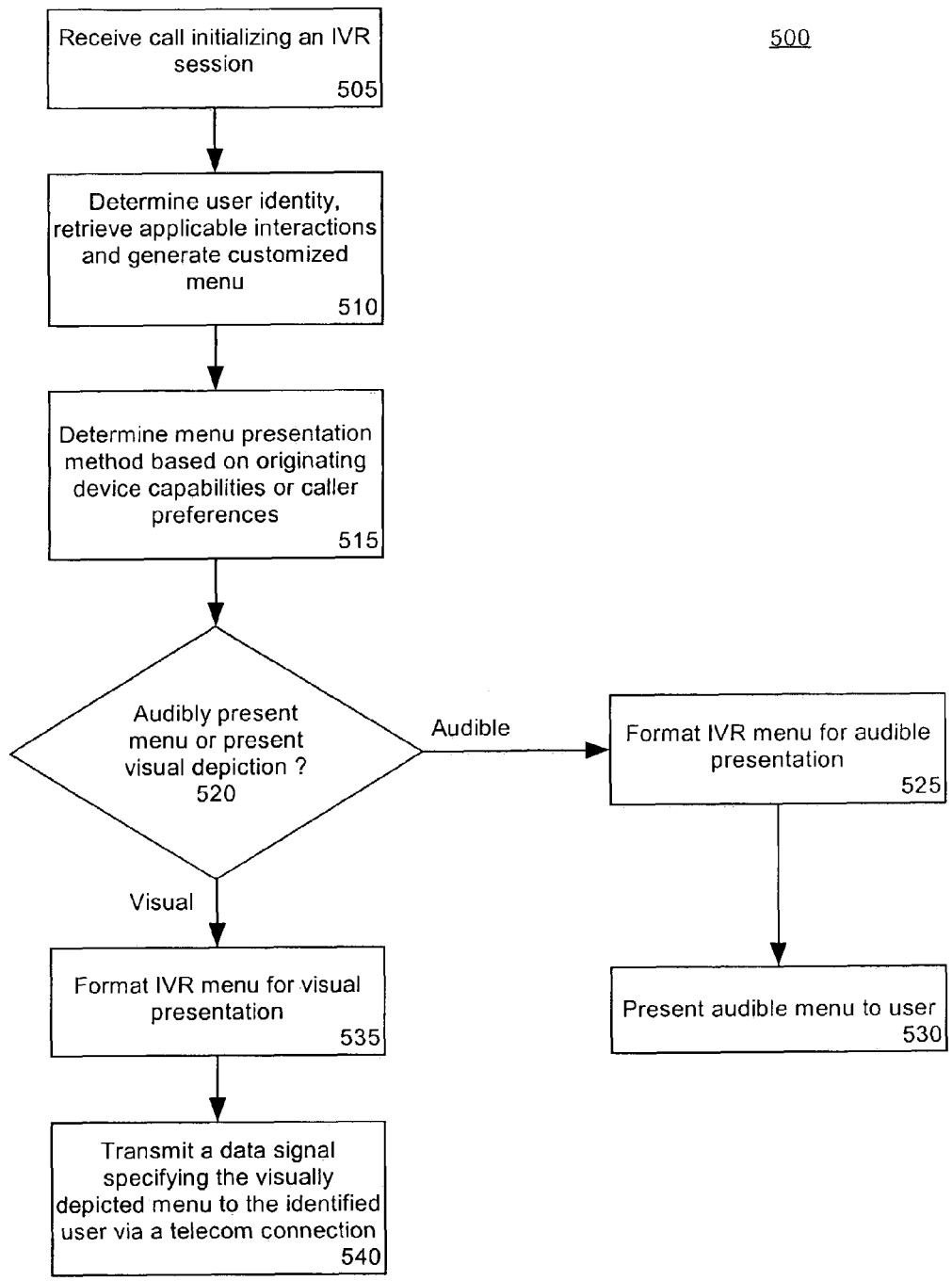
FIG. 5 is a flow chart illustrating a method of presenting customized menus in accordance with the system of FIG. 1.

FIG. 5 is a flow chart illustrating a method 500 of presenting customized menus in accordance with the system of FIG. 1. The method 500 can be performed in the context of an IVR system. The method can begin in step 505 where the IVR system receives a call initiating an IVR session. In step 510, the IVR system can determine a user identity, retrieve applicable interactions for the user identity, and generate a customized menu. These functions can occur in the manner previously specified. In step 515, the IVR system can determine a menu presentation method. This method can be based upon the capabilities of an originating device or a caller preference. For example, in one embodiment, the user can select an IVR option triggering a transmission of a visually rendered menu. The transmission could be sent to a facsimile machine or to some other presentation device, such as a PDA or a Web-enabled cell phone, capable of visually displaying an IVR menu.

In step 520, the IVR system can determine whether to audibly present the IVR menu or whether to present a visual depiction of the IVR menu. If an audible menu is specified, the method can proceed to step 525 where the IVR system can format the IVR menu for audible presentation. A voice server can be configured to convert text to speech or the IVR system can use an audio playback system. In step 530, the IVR system can present the audible menu to the user.

If in step 520 a visual menu is specified, the method can proceed to step 535 where the IVR system can format the IVR menu for visual presentation. Details for this format can depend upon the device that receives the visual presentation. For example, different formats can be utilized depending on whether the receiving device is a facsimile machine, a Web enabled cellular phone, a computer, a personal data assistant, or some other device. In step 540, the formatted visual depiction of the menu can be digitally encoded within a signal. This signal can be transmitted via a telecom connection to the identified user. It should be appreciated that any encoding mechanism or protocol can be used in step 540. For example, the visual depiction can be encoded using a markup language and transmitted using the hypertext transfer protocol. Once the signal is received, the user can decode the transmission and display the visual depiction of the menu. Then, the user can make a menu selection and convey the selection to the IVR system; resulting in a desired IVR operation.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method for updating a customized menu, the method comprising:
   receiving, by an identity processor of a system comprising a speech recognition engine and a data store, a voice response to a prompt issued by the identity processor to a user;
   selecting a voice profile specifying vocal characteristics of the user from the data store;
   matching the selected voice profile recognized by the speech recognition engine, to the user voice response to identify the user;
   upon identifying the user, determining an account number and a category of the user, the category associated with category usage data generated by users categorized in said category;
   determining a location of the user using a location method;
   retrieving, from the data store, historical information associated with the user;
   generating a customized menu for the user based on the user's historical information, the user's category and the user's location, wherein the customized menu comprises nodes associated with actions;
   tracking user interactions with the system and nodes associated with the user's interactions;
   updating the user's historical information with the tracked interactions and nodes;
   generating an updated customized menu for the user based on the user's updated historical information, the user's category and the user's location;
   formatting the updated customized menu for visual presentation; and
   transmitting a signal comprising the updated customized menu to a receiving device accessed by the user, wherein the receiving device displays a visual depiction of the updated customized menu.

2. The method of claim 1, wherein the receiving device comprises a cellular phone.

3. The method of claim 1, wherein the receiving device comprises a personal data assistant.

4. The method of claim 1, wherein formatting the updated customized menu further comprises formatting the updated customized menu for display on the receiving device.

5. The method of claim 1, further comprising formatting the updated customized menu for audible presentation.

6. The method of claim 1, wherein the category usage data indicates which nodes are most frequently accessed by the users categorized in said category, and wherein the customized menu is based on which nodes are most frequently accessed by the users categorized in said category.

7. The method of claim 1, wherein the nodes associated with actions are included in a hierarchical structure.

8. The method of claim 1, further comprising monitoring administrative events relating to operators of at least one interactive voice response node, and generating a customized menu for the user based on at least one administrative event.

9. The method of claim 1, further comprising performing speech-to-text conversion on the voice response.

10. A computer system comprising:
    at least one memory that stores processor-executable instructions configured to provide customized interactive voice response menus; and at least one hardware processor, coupled to the at least one memory, that is configured to execute the processor-executable instructions to cause performance of a method comprising:

receiving, by an identity processor of a system comprising a speech recognition engine and a data store, a voice response to a prompt issued by the identity processor to a user;

selecting a voice profile specifying vocal characteristics of the user from the data store;

matching the selected voice profile recognized by the speech recognition engine, to the user voice response to identify the user;

upon identifying the user, determining an account number and a category of the user, the category associated with category usage data generated by users categorized in said category;

determining a location of the user using a location method;

retrieving, from the data store, historical information associated with the user;

generating a customized menu for the user based on the user's historical information, the user's category and the user's location, wherein the customized menu comprises nodes associated with actions;

tracking user interactions with the system and nodes associated with the user's interactions;

updating the user's historical information with the tracked interactions and nodes;

generating an updated customized menu for the user based on the user's updated historical information, the user's category and the user's location;

formatting the updated customized menu for visual presentation; and transmitting a signal comprising the updated customized menu to a receiving device accessed by the user, causing the receiving device to display a visual depiction of the updated customized menu.

11. The computer system of claim 10, wherein the receiving device comprises a cellular phone.

12. The computer system of claim 10, wherein the receiving device comprises a personal data assistant.

13. The computer system of claim 10, wherein the at least one hardware processor is configured to execute the processor-executable instructions to cause performance of the method, the method further comprising formatting the updated customized menu for display on the receiving device.

14. The computer system of claim 10, wherein the at least one hardware processor is configured to execute the processor-executable instructions to cause performance of the method, the method further comprising formatting the updated customized menu for audible presentation.

15. The computer system of claim 10, wherein the category usage data indicates which nodes are most frequently accessed by the users categorized in said category, and wherein the customized menu is based on which nodes are most frequently accessed by the users categorized in said category.

16. The computer system of claim 10, wherein the nodes associated with actions are included in a hierarchical structure.

17. The computer system of claim 10, wherein the at least one hardware processor is configured to execute the processor-executable instructions to cause performance of the method, the method further comprising monitoring administrative events relating to operators of at least one interactive voice response node, and generating a customized menu for the user based on at least one administrative event.

18. The computer system of claim 10, wherein the at least one hardware processor is configured to execute the processor-executable instructions to cause performance of the method, the method further comprising performing speech-to-text conversion on the voice response.

* * * * *